United States Patent [19]

Ishizaki et al.

[11] Patent Number: 4,701,626
[45] Date of Patent: Oct. 20, 1987

[54] ACCUMULATION TIME ADJUSTING DEVICE FOR PHOTO-ELECTRIC CONVERTER

[75] Inventors: Akira Ishizaki, Yokohama; Kazuhiko Arakawa, Tokyo, both of Japan

[73] Assignee: Canon Kabushiki Kaisha, Tokyo, Japan

[21] Appl. No.: 653,839

[22] Filed: Sep. 24, 1984

[30] Foreign Application Priority Data

Sep. 30, 1983 [JP] Japan .............................. 58-182189

[51] Int. Cl.⁴ ............................................ H01J 40/14
[52] U.S. Cl. ................................ 250/578; 358/213.19
[58] Field of Search ............... 250/578, 211 R, 211 J; 358/211, 212, 213; 357/24 LR, 30-32; 377/57, 59, 61-63

[56] References Cited

U.S. PATENT DOCUMENTS

| | | |
|---|---|---|
| 4,283,137 | 8/1981 | Tsunekawa et al. . |
| 4,340,819 | 7/1982 | Ogasawara et al. ................ 250/578 |
| 4,479,062 | 10/1984 | Kawasaki et al. ................. 250/578 |
| 4,523,101 | 6/1985 | Tsunekawa ........................ 250/578 |

*Primary Examiner*—Edward P. Westin
*Attorney, Agent, or Firm*—Fitzpatrick, Cella, Harper & Scinto

[57] ABSTRACT

There is disclosed a device for correcting the accumulation time of a photoelectric converter composed of self-scanning charge-accumulation elements of plural bits on the basis of the average intensity to the incident light to the converter. The charge accumulation time is controlled by determining a reference value according to the maximum value of the output signals obtained from the photoelectric converter and comparing this reference value with the average intensity.

10 Claims, 8 Drawing Figures

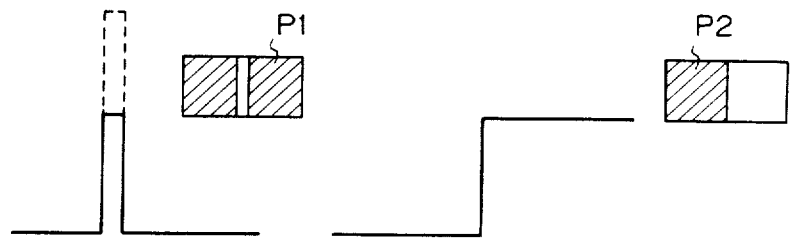
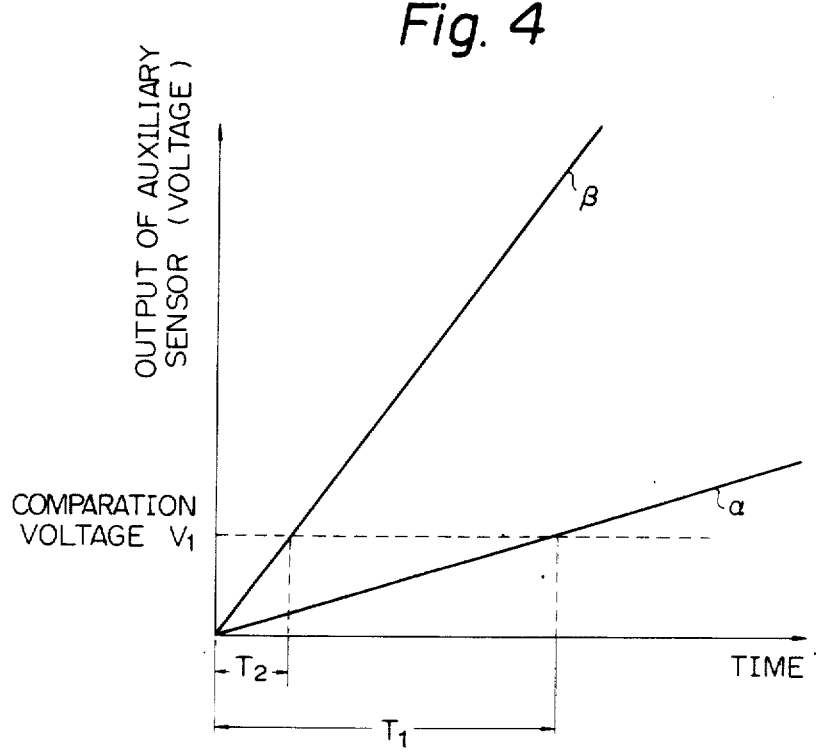

Fig. 5A
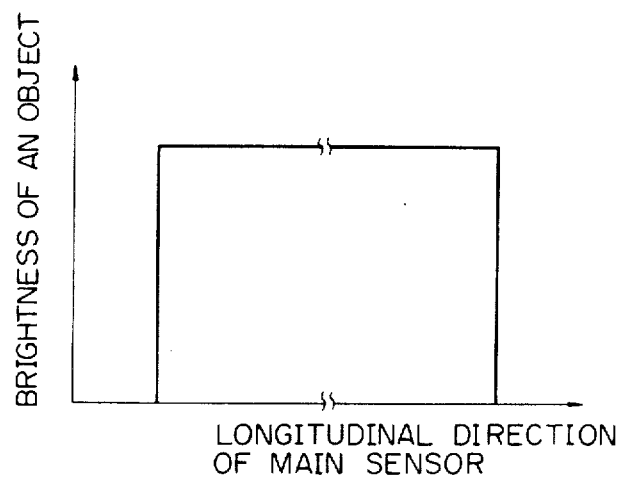
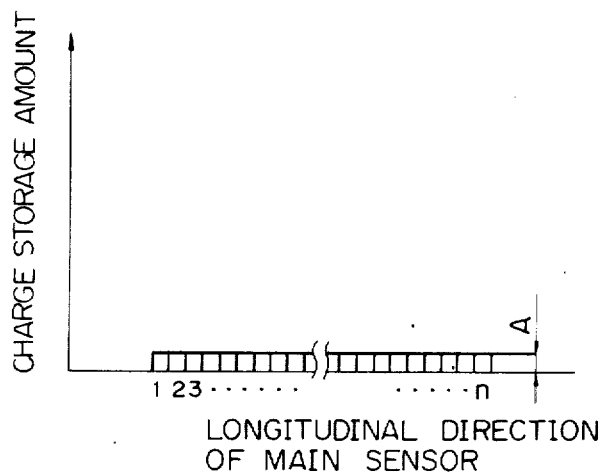

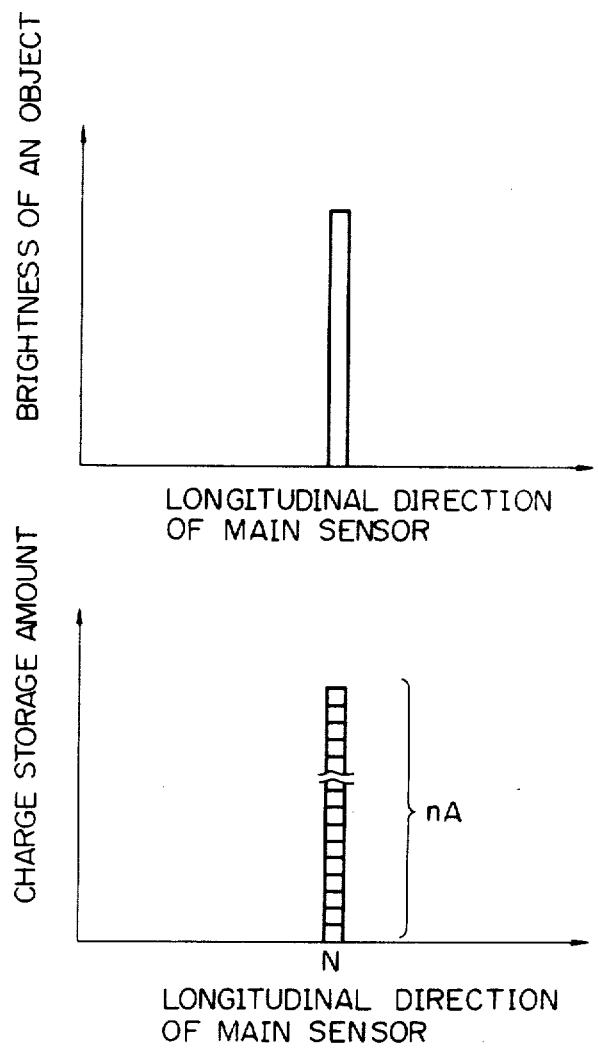

Fig. 6

| BIT SIGNAL | | | | D/A CONVERSION OUTPUT (V) |
|---|---|---|---|---|
| a | b | c | d | |
| 0 | 0 | 0 | 0 | $E_1$ |
| 0 | 0 | 0 | 1 | $E_2$ |
| 0 | 0 | 1 | 0 | $E_3$ |
| 0 | 0 | 1 | 1 | $E_4$ |
| 0 | 1 | 0 | 0 | $E_5$ |
| 0 | 1 | 0 | 1 | $E_6$ |
| 0 | 1 | 1 | 0 | $E_7$ |
| 0 | 1 | 1 | 1 | $E_8$ |
| 1 | 0 | 0 | 0 | $E_9$ |
| 1 | 0 | 0 | 1 | $E_{10}$ |
| 1 | 0 | 1 | 0 | $E_{11}$ |
| 1 | 0 | 1 | 1 | $E_{12}$ |
| 1 | 1 | 0 | 0 | $E_{13}$ |
| 1 | 1 | 0 | 1 | $E_{14}$ |
| 1 | 1 | 1 | 0 | $E_{15}$ |
| 1 | 1 | 1 | 1 | $E_{16}$ |

P (PRESET POSITION) → row with 1 0 0 0 ($E_9$)

ACCUMULATION TIME ADJUSTING DEVICE FOR PHOTO-ELECTRIC CONVERTER

BACKGROUND OF THE INVENTION

1. Field of Invention

The present invention relates to an accumulation time correcting device for a photoelectric converter composed of self-scanning charge-accumulation elements capable of automatic gain control on the basis of the average of the incident light.

2. Description of the Prior Art

A self-scanning charge-accumulation device such as a charge-coupled device (CCD) is often employed as a photosensor, for example, in an automatic focusing unit for camera. In such device, the charges are accumulated for a predetermined time, and the signals are transferred when the charges are accumulated up to a predetermined level suitable for signal processing. In such a device, an excessively long accumulation time leads to the charge overflow phenomenon, thus destroying the proportional relationship between the amount of light received and the amount of accumulated charge, while an excessively short accumulating time gives rise to an insufficient S/N ratio since the signals are mingled with noises such as dark current. In the use of such self-scanning charge-accumulation devices for an automatic focusing unit, therefore, it is desirable to regulate the charge accumulation time according to the brightness of the object, so as to maintain the accumulated charge at an optimum level.

In order to obtain an output signal of an appropriate level from the self-scanning charge-accumulation device, it has conventionally been proposed to monitor the output of said device obtained at a predetermined accumulation time, to regulate said accumulation time on the basis of said output, and to repeat the above-described procedure until the output of said device reaches a desired level, prior to the output signal processing.

In such a method, the accumulation time of the self-scanning charge-accumulation device is not determined on the basis of real-time but is predicted in response to the preceding accumulation time maintained in memory and to the output of the device.

In the case of an object illuminated with a light source intermittently activated at the line supply frequency such as a fluorescent lamp, the start of charge accumulation has to be synchronized with the on-off action of the light source in order to eliminate the influence of the power supply frequency. Thus, in order to achieve synchronization with both the widely employed frequencies of 50 and 60 Hz, the charge accumulation should be started every 100 milliseconds, or at a frequency of 10 Hz which is the greatest common measure of the abovementioned two frequencies. In such a method, however, the data can only be obtained every 100 milliseconds even when a short accumulating time is required, and a prolonged data processing time will be required if such photoelectric converter is employed for automatic focus control.

In order to avoid synchronization for the frequencies of 50 and 60 Hz, it is also proposed to provide an auxiliary photoelectric sensor for measuring the average brightness of the object in addition to the main photoelectric sensor employed for signal processing, and to determine the accumulation time on real-time basis from the output of said auxiliary sensor. Though this method avoids the necessity for the above-described synchronization, the average of the accumulated charge may be significantly different, if the main sensor is composed of a linear sensor of plural bits, from the peak charge accumulation in a particular bit depending on the distribution and contrast of the brightness of the object. More specifically, in the above-described method in which the auxiliary sensor measures the average luminance of the object and the charge accumulation of the main sensor is terminated when said average reaches a determined value, the obtained signals may not conform to the brightness pattern of the object since the accumulated charge may be saturated already in certain bits of the main sensor.

SUMMARY OF THE INVENTION

A first object of the present invention is to avoid the aobve-mentioned drawbacks of the conventional device, and a second object of the present invention is to provide an accumulation time correcting device for a photoelectric converter capable of determining the charge accumulation time according to the average intensity of the incident light determined by an auxiliary sensor and at the same time correcting the charge accumulation time in response to the peak output of the main sensor, thereby providing output signals of an appropriate level from the main sensor regardless of the brightness distribution of the pattern of the object.

BRIEF DESCRIPTION OF THE DRAWINGS

FIGS. 3A and 3B are charts showing output singals of the auxiliary sensor in response to various object patterns;

FIG. 4 is a chart showing the output of the auxiliary sensor as a function of time corresponding to FIGS. 3A and 3B;

FIGS. 5A and 5B are charts showing the relation among the object pattern, output signal of the main sensor and accumulated charge; and FIG. 6 is a chart showing the relationship between the bit signal of a presettable up-down counter 8a shown in FIG. 1 and a D/A converter 10.

DETAILED DESCRIPTION OF THE PREFERRED EMBODIMENTS

Figure 1:
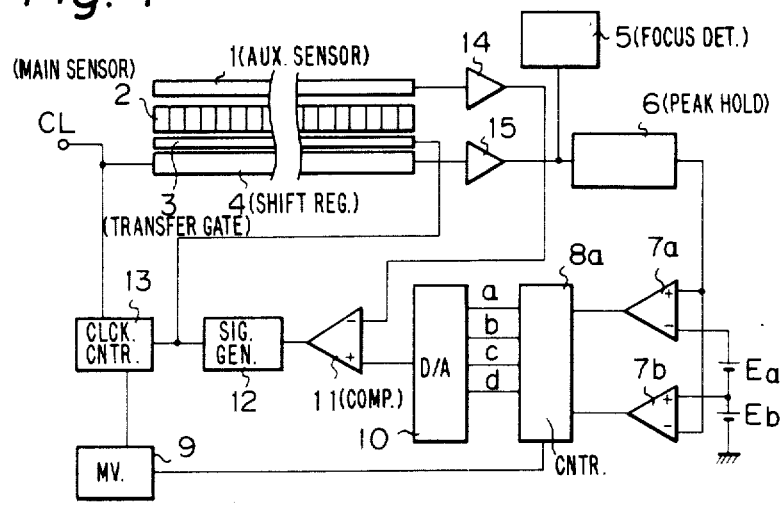
FIG. 1 is a block diagram of a first embodiment in which the accumulation time adjusting device of the present invention is applied to an automatic focus detecting unit.

FIG. 1 is a block diagram showing a first embodiment in which the accumulation time adjusting device of the present invention is applied to an automatic focus detecting unit.

In FIG. 1 there are provided an auxiliary sensor 1 of a single pixel and a main sensor 2 for automatic focusing composed of a photoelectric converting device of n bits, which is positioned parallel to and is approximately as long as the auxiliary sensor 1. The output signals of said main sensor 2 are supplied through a transfer gate 3 to a shift register 4, the output of which signal is in turn supplied through an amplifier 15 both to a focus detection processing circuit 5 and through a peak hold circuit 6 to comparator circuit 7a, 7b for comparisons respectively with voltages Ea, Eb (Ea>Eb). The output signals of said comparators 7a, 7b are supplied to a presettable up-down counter 8a, which supplies a binary bit signal to a D/A converter circuit 10 in synchronization with the signals from a one-shot multivibrator 9. The output signal of said D/A converter circuit is supplied to an input terminal of a comparator 11 of which the other input terminal receives the output signal of the auxiliary sensor 1 through an amplifier 14. The comparator 11 sends a signal to a transfer data control signal generator 12, which supplies a control signal and a clear signal respectively to the transfer gate 3 and a clock counter 13. Clock pulses are supplied to the main sensor 2, transfer gate 3 and clock counter 13, and said clock counter is self-cleared upon reaching a determined count and simultaneously releases a signal to activate the one-shot multivibrator 9.

In FIG. 1, at the initial state, an initial value is preset in the up-down counter 8a. When the number of clock pulses reaches a predetermined count in the clock counter 13, a signal is supplied through the one-shot multivibrator 9 to the up-down counter 8a, which in response supplies said initial value to the D/A converter 10 for conversion into an analog value. The corresponding output is compared in the comparator 11 with the output of the auxiliary sensor 1, and, if the latter exceeds the former, a signal is supplied from the comparator 11 through the transfer data control signal generator 12 to the transfer gate 3, whereby the signals accumulated in the photoelectric converting elements constituting the main sensor 2 are transferred to the shift register 4 through the transfer gate 3. Simulataneously, the above-mentioned signal activates the clock counter 13, whereby the shift register initiates the signal transfer in synchronization with the clock signals released from the clock counter 13. The signals thus transferred are utilized for focus detection of a picture-taking lens in the focus detection processing circuit 5, but the details of this procedure will be omitted.

The peak hold circuit 6 detects the maximum peak value of the signals supplied from the main sensor 2. The output signal of said peak hold circuit 6 is supplied to the comparators 7a, 7b, and the comparator 7a releases a signal "1" to subtract "1" from the up-down counter 8a if said peak value exceeds the voltage Ea, while the comparator 7b releases a signal "1" to add "1" to said up-down counter 8a if said peak value is lower than the voltage Eb. In case the peak value is positioned between Ea and Eb, the comparators 7a, 7b do not release output signals since the count of the up-down counter 8a is appropriate.

Consequently, the output of the up-down counter 8a gradually approaches a value corresponding to the peak value for a same object, and the charge accumulation in the auxiliary sensor 1 at the activation of the transfer gate 3 is controlled in such a manner that the peak value of the main sensor 2 reaches an appropriate value. In this manner, the charge accumulation time can be determined on real time basis, and no consideration is required for synchronization for the frequencies of 50 and 60 Hz of the illuminating light source.

Figure 2:
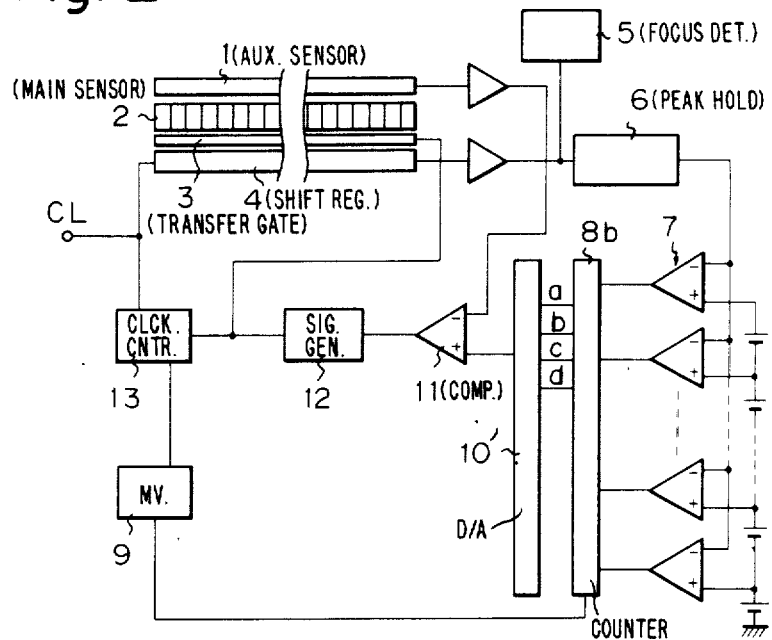
FIG. 2 is a block diagram of a second embodiment in which the accumulation time adjusting device of the present invention is applied to an automatic focus detecting unit.

With respect to objects of two different patterns P1, P2, as shown in FIGS. 3A and 3B, which have same light and dark brightness levels in different distributions, if the longitudinal length of the auxiliary sensor 1 is the same as that of the main sensor 2, the former should provide the average of the output of the latter. Thus, the output of the auxiliary sensor 1, in response to the objects shown in FIGS. 3A and 3B, varies as indicated by lines $\alpha$, $\beta$ shown in FIG. 4. Thus, if the voltage V1 for comparison released from the D/A converter circuit 10 shown in FIGS. 1 and 2 is fixed constant as represented by a broken line in FIG. 4, the time required by the output of the auxiliary sensor 1 to reach the above-mentioned constant voltage V1 for comparison becomes significantly different, as represented by T1 and T2, although the patterns shown in FIGS. 3A and 3B have a same level of brightness in the light image area. Therefore, the peak output value of the main sensor 2 becomes significantly different due to a difference in the accumulating time.

In a case in which the main sensor 2 of n bits receives two different patterns which, as shown in FIGS. 5A and 5B, have a same level of brightness in the light image area but different lengths in the longitudinal direction of said main sensor 2, FIG. 5A represents that all n bits receive light of a same intensity and a charge A is accumulated per bit. Thus, when a charge nA is accumulated in the entire main sensor 2, the output of the auxiliary sensor 1 reaches the voltage of comparison of the comparator circuit 11 to terminate the accumulation. On the other hand, in case the light of the same intensity enters only an N-th bit of the main sensor 2 as shown in FIG. 5B, the accumulation is terminated when a charge nA is accumulated in the same manner as in the case of FIG. 5A, since the auxiliary sensor 1 only measures the average output of the main sensor 2. Consequently, the accumulating time in this case is n times longer than that in case of FIG. 5A, and the peak output value of the main sensor 2 becomes equal to nA.

As explained above, in case a linear main sensor 2 of 100 bits is employed, the charge accumulated in a certain bit may vary 100 times depending on the brightness distribution of the object. However, the ratio of the maximum and minimum value of the charge that can be accumulated in a bit of linear sensor, namely the dynamic range of a self-scanning device, is generally determined by the noise level of the device and the maximum charge capacity of the photoelectric converting element and of the shift register, and is usually in the range of 10. Therefore, in a method of simply measuring the average intensity of the light entering the mainsensor 2 by means of the auxiliary sensor 1 and terminating the accumulation when said average intensity reaches a determined value, the self-scanning linear sensor of multiple bits has an insufficient dynamic range, thus giving rise to an overflow of the accumulated charge or intermingling of the signals with the noises, and leading to incorrect processing in the succeeding focus detection circuit.

In the present embodiment, therefore, there is provided a adjusting circuit to control the comparison voltage output from the D/A converting circuit 10 on the basis of the peak output value of the main sensor 2 at the end of each accumulation of the main sensor 2, thereby determining an appropriate accumulation time regardless of the pattern of the object.

More specifically, as shown in FIG. 6, the output voltage of the D/A converting circuit 10 is rendered variable in 16 steps from E1 to E16 by selecting a bit signal released from the up-down counter 8a. By presetting a binary signal corresponding to a point P as the initial value into the up-down counter 8a at the start of operation, the output voltage of the D/A converting circuit 10 is set to a voltage E9 corresponding to said initial value, whereby the transfer data control signal generator 12 releases an output signal to terminate the accumulation when the output voltage of the auxiliary sensor 1 exceeds the value E9.

In case the peak output value of the main sensor 2 read through the transfer gate 3 and the shift register 4 at the end of accumulation is not located in the expected range from Ea to Eb, there is generated a signal in the comparator circuit 7a or 7b through the output of the peak hold circuit 6 as explained before, whereby the output of the up-down counter 8a is shifted upwards or downwards to regulate the voltage of comparison. The above-explained sequence is repeated in the succeeding accumulation cycle of the main sensor 2 to determine an accumulaion time for obtaining the output signal of an appropriate level from the main sensor 2.

Consequently, in response to a brightness pattern as shown in FIG. 5A, the aforementioned repeated sequences increase the output of the D/A converter 10 constituting the reference signal of the comparator 11, thus increasing the peak output value of the pixels of the main sensor 2 to a predetermined range. On the other hand, in response to a brightness pattern as shown in FIG. 5B, said sequences reduce the output of the D/A converter 10 to decrease the peak output value of the pixels constituting the main sensor 2 to a predetermined range.

FIG. 2 represents a second embodiment in which the same components or circuits as those shown in FIG. 1 are represented by the same numbers. In said second embodiment, the output of the peak hold circuit 6 is supplied to plural comparators 7 for comparison with respectively different voltages, and the output signals thereof are supplied to a presettable up-down counter 8b composed for example of plural flip-flops. Said comparators 7 allow finer comparison of the peak value with plural voltages, so that the up-down counter 8b can provide more detailed input information.

The basic function of the embodiment shown in FIG. 2 is essentially the same as that of the first embodiment. In case the peak output value of the main sensor 2 is not located within the expected range, the comparators 7 provide more detailed signals to reduce the number of shifts required in the up-down counter 8b. Consequently the time required for determining the appropriate accumulation time is reduced in comparison with the foregoing embodiment, even when the initial value of the up-down counter 8b is significantly different from the accumulation time for obtaining the appropriate signal level.

In the foregoing two embodiments the auxiliary sensor 1 is positioned parallel to the main sensor 2, but it is also possible to form the auxiliary sensor 1 with transparent electrodes in superposed manner on the main sensor 2. Also the focus detection processing circuit 5 for focus detection in response to the output signal from the main sensor 2 may be so constructed as not to perform data processing in case the signal from the comparator 7 indicates that the peak value is located outside a determined range, in order to prevent erroneous detection.

As explained in the foregoing, the accumulation time adjusting device of the present invention for the photoelectric converter is provided with a circuit for adjusting the output of the auxiliary sensor for determining the charge accumulation time on the basis of the peak output value of the main sensor, thereby avoiding the necessity for synchronization of the start of the charge accumulation of the main sensor with the power supply frequency of the illuminating light source, and providing the output signal of an appropriate level constantly from the main sensor, without charge overflow from the main sensor or noise interference with the signal resulting from the distribution of the incident light intensity.

What is claimed is

1. An accumulation time control device for an accumulation type photo-electric converter composed of plural pixels capable of repeating the cycle of signal accumulation step and signal readout step, comprising:
   (a) means for detecting and outputting the maximum of the signals from plural pixels constituting said photo-electric converter;
   (b) average intensity detecting means for accumlating and outputting a signal corresponding to the average intensity of the incident light entering said photo-electric converter;
   (c) control means for comparing said accumulated signal corresponding to the average intensity with a reference signal and terminating the signal accumulation step and initiating the signal readout step when a determined relationship is reached between said signals; and
   (d) means for outputting said reference signal, comprising:
      (1) means for generating a preset reference signal, wherein said means for generating a preset reference signal comprises an up/down counter to be preset to a determined value at the start of function of said photo-electric converter and a circuit for D/A conversion of the count of said up/down counter, and
      (2) adjusting means for adjusting the preset reference signal on the basis of said maximum signal wherein said adjusting means comprises:
         (i) a window comparator for identifying whether said maximum signal is located between a first reference level and a second reference level higher than said first reference level; and
         (ii) means for increasing the count of said counter in response to an identification that said maximum signal is lower than the first reference level and decreasing the count of said counter in response to an identification that said maximum signal is higher than the second reference level.

2. A signal accumulation and a signal reading out apparatus for repeatedly performing a signal accumulating operation for an accumulated type photo-electric coverter having a plurality of pixels and repeatedly performing a reading out operation for reading out the accumulated signal, comprising:
   (a) maximum detecting means for detecting the maximum of the accumulated signals of said plural pixels;
   (b) average intensity detecting means for accumulating and outputting a signal corresponding to the average intensity of light incident on said photoelectric converter;
   (c) compare means for comparing an output from said average intensity detecting means with a reference value to terminate the signal accumulating operation when the output from said average intensity means has reached the reference value; and
   (d) determining means for adjusting the reference value on the basis of an output from said maximum detecting means, which corresponds to an accumulated signal accumulated in previous accumulating operation, to reset the reference value to be used for a subsequent accumulating operation, wherein said determining means comprises:

discriminating means for discriminating whether or not the output from said maximum detecting means is between first and second values; and control means for increasing the reference value when the output from said maximum detecting means is discriminated to be smaller than the first value and for decreasing the reference value when said output from said maximum detecting means is discriminated to be larger than the second value which is larger than the first value.

3. An accumulation control device for an accumulation type photo-electric converter composed of plural pixels capable of repeating the cycle of signal accumulation step and signal readout step, comprising:

(a) means for detecting and outputting the maximum of the signals from plural pixels constituting said photo-electric converter;

(b) average intensity detecting means for accumulating and outputting a signal corresponding to the average intensity of the incident light entering said photo-electric converter;

(c) control means for comparing said accumulated signal corresponding to the average intensity with a reference signal and terminating the signal accumulation step and initiating the signal readout step when a determined relationship is reached between said signals; and (d) means for outputting said reference signal, comprising:
  (1) means for generating a preset reference signal; and
  (2) adjusting means for adjusting the preset reference signal on the basis of said maximum signal, wherein said adjusting means comprises
    (i) a window comparator for identifying whether said maximum signal is located between a first reference level and a second reference level higher than said first reference level; and
    (ii) control means for increasing said reference signal when said maximum signal is identified to be lower than the first reference level and decreasing said reference signal when said maximum signal is identified to be higher than the second reference level.

4. A signal accumulation and signal reading out apparatus for repeatedly performing a signal accumulating operation for an accumulated type photo-electric converter having a plurality of pixels and repeatedly performing a reading out operation for reading out the accumulated signal, comprising:

(a) maximum detecting means for detecting the maximum of the accumulated signals of said plural pixels;

(b) average intensity detecting means for accumulating and outputting a signal corresponding to the average intensity of light incident on said photo-electric converter;

(c) control means for comparing an output from said average intensity detecting means with a reference value to terminate the signal accumulating operation when the output from said average intensity means has reached the reference value; and (d) adjusting means for discriminating whether or not an output from said maximum detecting means is between first and second values to change the reference value on the basis of the discriminated result so that the output from said maximum detecting means is between the first and second values.

5. A signal accumulation and a signal reading out apparatus for repeatedly performing a signal accumulating operation for an accumulated type photo-electric converter having a plurality of pixels and repeatedly performing a reading out operation for reading out the accumulated signal, comprising:

(a) maximum detecting means for detecting the maximum of the accumulated signals of the plural pixels;

(b) average intensity detecting means for accumulating and outputting a signal corresponding to the average intensity of light incident on said photo-electric converter;

(c) compare means for comparing an output from said average intensity detecting means with a reference value to terminate the signal accumulating operation when the output from said average intensity means has reached the reference value; and (d) determining means for storing an output from said maximum detecting means, which corresponds to an accumulated signal accumulated in a previous accumulating operation, and adjusting the reference value on the basis of the stored value to be used used for a subsequent accumulating operation, wherein said determining means comprises:

discriminating means for discriminating whether or not the output from said maximum detecting means is between first and second values; and control means for increasing the reference value when the output from said maximum detecting means is discriminated to be smaller than the first value and for decreasing the reference value when said output from said maximum detecting means is discriminated to be larger than the second value which is larger than the first value.

6. An apparatus according to claim 5, wherein said average intensity detecting means comprises an accumulation type photo-electric converting element positioned in the vicinity of said photo-electric converter and has a length substantially equal to that of said photo-electric converter.

7. An apparatus according to claim 6, wherein said control means includes an up/down counter for increaing or decreasing the reference value, wherein said up/down counter up-counts to increase the reference value when said discriminating means discriminates that an output from said maximum detecting means is smaller than a first value, and down-counts to decrease the reference value when said discriminating means discriminates that an output from said maximum detecting means is larger than a second value.

8. A signal accumulation and signal reading out apparatus for repeatedly performing a signal accumulating operation for an accumulated type photo-eletric converter having a plurality of pixels and repeatedly performing a reading out operation for reading out the accumulated signal, comprising:

(a) average intensity detecting means for accumulating and outputting a signal corresponding to the average intensity of light incident on said photo-electric converter;

(b) compare means for comparing an output from said average intensity detecting means with a reference value to terminate the signal accumulating operation when the output from said average intensity means has reached the reference value;

(c) discriminating means for discriminating whether or not a signal corresponding to the accumulated signal of said pixels is between first and second values; and (d) control means for increasing the reference values when the signal corresponding to the accumulated signal is discriminated to be smaller than the first value and for decreasing the reference value when the signal corresponding to the accumulated signal is discriminated to be larger than the second value.

9. An apparatus according to claim 8, wherein said control means includes an up/down counter for increasing or decreasing the reference value by changing the count thereof, wherein said counter up-counts to increase the reference value when it is discriminated that the signal corrsponding to the accumulated signal is smaller than a first value, and down-counts to decrease the reference value when it is discriminated that the signal corresponding to the accumulated signal is larger than a second value.

10. An apparatus according to claim 8, wherein said average intensity detecting means comprises an accumulation type photo-electric converting element positioned in the vicinity of said photo-electric converter and has a length substantially equivalent to that of said photo-electric converter.

* * * * *

UNITED STATES PATENT AND TRADEMARK OFFICE
CERTIFICATE OF CORRECTION

PATENT NO. : 4,701,626

DATED : October 20, 1987

INVENTOR(S) : AKIRA ISHIZAKI, ET AL.

It is certified that error appears in the above-identified patent and that said Letters Patent is hereby corrected as shown below:

IN THE DRAWINGS

Sheet 2, Fig. 4, COMPARATION" should read --COMPARISON--.

COLUMN 1

Line 56, "abovementioned" should read --above-mentioned--.

COLUMN 2

Line 18, "aobve-mentioned" should read --above-mentioned--.
Line 39, "singals" should read --signals--.

COLUMN 3

Line 32, "Simulataneously," should read --Simultaneously,--.

COLUMN 4

Line 54, "a" should read --an--.

COLUMN 5

Line 14, "accumulaion" should read --accumulation--.

COLUMN 6

Line 15, "accumlating" should read --accumulating--.

UNITED STATES PATENT AND TRADEMARK OFFICE
CERTIFICATE OF CORRECTION

PATENT NO. : 4,701,626

DATED : October 20, 1987

INVENTOR(S) : AKIRA ISHIZAKI, ET AL.

It is certified that error appears in the above-identified patent and that said Letters Patent is hereby corrected as shown below:

COLUMN 8

Lines 47-48, "increaing" should read --increasing--.

COLUMN 10

Line 3, "corrsponding" should read --corresponding--.

Signed and Sealed this

Fourteenth Day of June, 1988

Attest:

DONALD J. QUIGG

Attesting Officer

Commissioner of Patents and Trademarks